United States Patent
Kolarski et al.

(10) Patent No.: US 9,939,087 B2
(45) Date of Patent: Apr. 10, 2018

(54) DOUBLE-WALLED PIPE WITH INTEGRATED HEATING CAPABILITY FOR AN AIRCRAFT OR SPACECRAFT

(71) Applicant: Airbus Operations GmbH, Hamburg (DE)

(72) Inventors: Robertino Kolarski, Hamburg (DE); Magnus Koehler, Hamburg (DE); Alexander Scheidt, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/132,340

(22) Filed: Apr. 19, 2016

(65) Prior Publication Data
US 2016/0312924 A1  Oct. 27, 2016

(30) Foreign Application Priority Data
Apr. 21, 2015  (EP) .................................... 15164473

(51) Int. Cl.
*F16L 53/00* (2006.01)
*F16L 9/18* (2006.01)
(Continued)

(52) U.S. Cl.
CPC ............... *F16L 9/18* (2013.01); *B64D 15/04* (2013.01); *F16L 9/125* (2013.01); *F16L 53/007* (2013.01); *F16L 59/143* (2013.01); *B29C 64/124* (2017.08); *B29K 2105/0023* (2013.01); *B29K 2995/0005* (2013.01); *B29K 2995/0015* (2013.01); *B29L 2023/225* (2013.01); *B29L 2031/3076* (2013.01); *B29L 2031/3097* (2013.01); *B33Y 10/00* (2014.12); *B33Y 80/00* (2014.12)

(58) Field of Classification Search
CPC . F16L 9/18; F16L 9/125; F16L 53/007; B64B 15/12; B64B 15/04
USPC .............. 138/32, 33, 114–117; 392/472, 488
See application file for complete search history.

(56) References Cited

U.S. PATENT DOCUMENTS 4,014,369 A * 3/1977 Kobres, Jr. ............. F16L 59/06
138/112
5,896,895 A * 4/1999 Simpkin ................. F01K 23/02
138/113
(Continued)

FOREIGN PATENT DOCUMENTS

DE  2325227  12/1974
DE  29504127  7/1996
(Continued)

OTHER PUBLICATIONS

European Search Report, dated Oct. 8, 2015, priority document.

*Primary Examiner* — Patrick F Brinson
(74) *Attorney, Agent, or Firm* — Greer, Burns & Crain Ltd.

(57) ABSTRACT

A double-walled pipe with integrated heating capability for an aircraft or spacecraft includes a pipe body rigidly formed from plastic in one piece with an inner wall, with an outer wall and with a plurality of wall supports, the wall supports connecting the inner wall to the outer wall, the inner wall and the outer wall defining an intermediate space. The double-walled pipe further includes an electrically conductive coating surrounding the inner wall within the intermediate space and configured to heat up under application of an electric current such that heat is transferred to the inner wall.

14 Claims, 3 Drawing Sheets

(51) Int. Cl.

| | |
|---|---|
| *B64D 15/04* | (2006.01) |
| *F16L 59/14* | (2006.01) |
| *F16L 9/12* | (2006.01) |
| *B33Y 10/00* | (2015.01) |
| *B33Y 80/00* | (2015.01) |
| *B29K 105/00* | (2006.01) |
| *B29L 23/00* | (2006.01) |
| *B29L 31/30* | (2006.01) |
| *B29C 64/124* | (2017.01) |

(56) References Cited

U.S. PATENT DOCUMENTS

| | | | |
|---|---|---|---|
| 7,268,562 B2* | 9/2007 | Aisenbrey | A01K 3/005 |
| | | | 138/140 |
| 9,046,207 B2* | 6/2015 | Bigex | B32B 1/08 |
| 9,371,942 B2* | 6/2016 | Jensen | F01N 3/208 |
| 2010/0206415 A1 | 8/2010 | Ellis et al. | |
| 2011/0214847 A1* | 9/2011 | Hur | F28D 7/106 |
| | | | 165/143 |
| 2013/0028580 A1* | 1/2013 | Bigex | F16L 59/143 |
| | | | 392/488 |
| 2013/0048135 A1* | 2/2013 | Blumenthal | F16L 59/147 |
| | | | 138/114 |
| 2013/0108251 A1* | 5/2013 | Denniel | F16L 53/007 |
| | | | 392/468 |
| 2014/0023812 A1 | 1/2014 | Hammer et al. | |
| 2014/0084583 A1 | 3/2014 | Hemingway et al. | |

FOREIGN PATENT DOCUMENTS

| | | |
|---|---|---|
| DE | 202005004602 | 7/2005 |
| FR | 2606117 | 5/1988 |
| WO | 2012166546 | 12/2012 |

* cited by examiner

DOUBLE-WALLED PIPE WITH INTEGRATED HEATING CAPABILITY FOR AN AIRCRAFT OR SPACECRAFT

CROSS-REFERENCES TO RELATED APPLICATIONS

This application claims the benefit of the European patent application No. 15164473.9 filed on Apr. 21, 2015, the entire disclosures of which are incorporated herein by way of reference.

BACKGROUND OF THE INVENTION

The present invention pertains to a double-walled pipe with integrated heating capability for an aircraft or spacecraft and a method for manufacturing a double-walled pipe of this type.

Although applicable to various pipe systems for any kind of aircraft or spacecraft or the like, the present invention and the problem on which it is based will be explained in greater detail with reference to water pipes of commercial aircraft. In principle, however, the present invention may also be utilized in other pipe systems that are configured for transportation of various fluids like oil, fuel, water or the like. Further, the present invention may be used in various parts of aircraft, like, for example, aircrafts floors, wings, cargo bays, etc., in particular, in the context of ice protection applications.

In contemporary commercial aircraft a plurality of water pipes are used for applications like waste water transportation, cargo drainage, or humidifier piping. These pipes are often formed from stainless steel or titanium and are connected by welded elbows and T-pieces or similar elements. However, the temperature of the air around aircraft may drop significantly below the freezing point during operation in high altitudes. In order to prevent water pipes from freezing during flight, water conduits are typically heated and/or drained of any fluid. Heating may, for example, be provided by a linear tape heater. In this case, a linear electrical heating tape may be attached to one side of the pipes. In addition, the heater and/or the pipes may be surrounded by electrical and/or thermal insulation means. In order to transfer heat from a heater to the pipe walls more efficiently, a heating layer may be provided that fully surrounds the outer surface of the pipes. In this case, the entire pipe surface may be heated and power consumption may be reduced.

Document DE 10 2010 010 929 A1 discloses, for example, a self-heating water conduit segment made from metal with an integrated heating device. The heating device is a semiconductor heating device comprising an inner conductor being surrounded by a semiconductor layer, which in turn is surrounded by an outer conductor. The inner conductor hereby serves as an inner pipe for water transportation.

Document DE 20 2005 004 602 U1 discloses a heated flexible plastic hose that includes an extruded inner plastic sleeve surrounded by a layer of a conductive polymer with a positive temperature coefficient (PTC) for heating of the inner sleeve. The conductive layer itself is surrounded by an outer plastic sleeve that is sprayed on the conductive layer.

In general, any weight reduction per pipe can have significant impact on aircraft load and, in consequence, fuel consumption. In addition, it is desirable to provide a means of heating that is as uniform and efficient as possible with minimal installation and/or production effort. 3D printing provides extraordinary design freedom and hence it is widely used for manufacturing with multiple applications in engineering, construction, industrial design, automotive industries, and aerospace industries. Amongst various advantages, it offers the possibility to manufacture complex hollow rigid structures in one piece that are much more cumbersome to produce with conventional manufacturing methods. Conventional methods often do not allow to produce hollow objects in an integral way at all, but require to assemble these from a number of individual subcomponents.

SUMMARY OF THE INVENTION

It is one of the ideas of the present invention to provide solutions for aircraft piping with integrated heating capability, which feature lightweight and efficient design while offering ease of installation and production.

According to a first aspect of the invention, a double-walled pipe with integrated heating capability for an aircraft or spacecraft comprises a pipe body. The pipe body is rigidly formed in one piece from plastic with an inner wall, with an outer wall and with a plurality of wall supports. The wall supports connect the inner wall to the outer wall. The inner wall and the outer wall define an intermediate space. The double-walled pipe further comprises an electrically conductive coating surrounding the inner wall within the intermediate space. The electrically conductive coating is configured to heat up under application of an electric current such that heat is transferred to the inner wall.

According to a second aspect of the invention, an aircraft or spacecraft comprises a double-walled pipe according to the first aspect of the invention.

According to a third aspect of the invention, a method for forming a double-walled pipe according to the first aspect of the invention comprises manufacturing a rigid pipe body in one piece from plastic with an inner wall, an outer wall and a plurality of wall supports, and an electrically conductive coating surrounding the inner wall using an additive manufacturing (AM) or 3D printing technique.

One idea of the present invention is to make use of the design freedom of 3D printing techniques to provide a lightweight pipe system with a double wall structure that defines an intermediate hollow structure, in which the pipe heating is located. Using 3D printing processes even complexly structured pipes may be manufactured as integral plastic objects in a cost and time efficient production manner. Double-walled pipes according to the present invention can either replace and/or complement various conventional pipes or conduits, e.g., standard metal pipes or the like. Plastic pipes may be manufactured in a fully rigid way similar to metal pipes. Hence, piping dimensions and routes may be well defined in compliance with safety regulations (e.g., minimal distances to other aircraft components). The outer wall of the pipe according to the present invention serves as an integrated electrical protection to the outside. The intermediate space and the respective electrically conductive layer may be optimized to provide heating over the entire surface of the inner pipe in a uniform and homogenous way. Thus, not only weight but also costs and power consumption can be significantly lowered.

Electrically conductive coatings within the meaning of the present invention comprise coatings, paints, inks or the like that are able to carry and transfer electric current and that can be applied to surfaces in thin films or layers. Such coatings are often provided as a dispersion of electrically conductive particles like silver or carbon. An electrically conductive coating can be fabricated, for example, by mixing an epoxy resin or synthetic polymer (providing the mechanical integrity of the coating) with carbon black particles (providing the electrical conductivity). By varying the carbon concentration it is possible to adjust the conductivity of such a coating.

In general, the solution of the invention offers great advantages for 3D printing or AM (additive manufacturing) technology since 3D components may be printed without the additional need for subjecting the components or objects to further processing steps such as milling, cutting or drilling. This allows for a more efficient, material saving and time saving manufacturing process. Particularly advantageous in general is the reduction of costs, weight, lead time, part count and manufacturing complexity coming along with employing AM technology for printing heated pipes or other objects used for, employed in or being part of airborne vehicles. Moreover, the geometric shape of the printed components or objects may be flexibly designed with regard to the intended technical purpose of parts or regions of the component/object.

Free form fabrication (FFF), direct manufacturing (DM), fused deposition modelling (FDM), powder bed printing (PBP), laminated object manufacturing (LOM), stereolithography (SL), selective laser sintering (SLS), selective laser melting (SLM), selective heat sintering (SHS), electron beam melting (EBM), direct ink writing (DIW), digital light processing (DLP) and additive layer manufacturing (ALM) belong to a general hierarchy of additive manufacturing (AM) methods, generally termed as 3D printing techniques. Those systems are used for generating three-dimensional objects based on digital model data by creating a cross-sectional pattern of the object to be formed and forming the three-dimensional solid object by sequentially building up layers of material. Any of such procedures will be referred to in the following description as AM or 3D printing without loss of generality. AM or 3D printing techniques usually include selectively depositing material layer by layer, selectively fusing or solidifying the material and removing excess material, if needed. 3D printing is currently used for prototyping and distributed manufacturing with multiple applications in engineering, construction, industrial design, automotive industries and aerospace industries.

According to some embodiments of the double-walled pipe, the pipe body and the electrically conductive coating are integrally formed. 3D printing makes it possible to print complex components in one piece that are composed of several distinct materials, e.g., two different synthetic polymers that may contain admixtures of particles for conducting an electrical current. Hence, in this embodiment of the invention, the pipe body can be manufactured together with the conductive layer in one single step.

The electrically conductive coating may have a positive temperature coefficient (PTC). Such a coating is particularly suited as a means for heating because the conductivity, which is directly related to the heat output, drops with increasing temperature and thus the system is self-regulating.

According to some embodiments of the invention, the electrically conductive coating may be an admixture of a synthetic resin and carbon particles. Due to the carbon particles, the coating becomes electrically conductive and hence can be used to heat the inner wall of the double-walled pipe. For this, the electrically conductive coating may be connected with electrodes or other conducting means.

The electrically conductive coating may fill up the intermediate space from the inner wall to the outer wall. In this embodiment, the configuration of the intermediate space defines the dimensions of the electrically conductive coating layer and thus the heating properties of the coating. In particular, the thickness of the electrically conductive coating is directly related to the resistivity of the coating and thus determines the heating properties of the double-walled pipe, e.g., the heat distribution across the surface of the inner wall.

The intermediate space may define a circumferential gap in between the inner wall and the outer wall having a substantially constant diameter along the pipe body. As the thickness of the electrically conductive coating fixes the heating properties of the double-walled pipe, a constant diameter secures constant and uniform heating properties of the electrically conductive coating. By fine tuning the intermediate space a uniform heat distribution may be achieved.

The outer wall may have an outer diameter in between 5 mm and 50 mm. The electrically conductive coating may have a radial thickness of less than about 300 µm. Manufacturing such small-dimensioned double-walled pipes is very intricate and laborious with conventional means. It is particularly challenging to form metal pipes with such thin gaps. In this respect, 3D printing or AM technology according to the present solution offers great advantages, because even very delicate and tiny structures may be formed precisely and efficiently.

According to some embodiments, the double-walled pipe may further comprise a conductor channel being formed along the pipe body within the intermediate space. The double-walled pipe may further comprise a conductor being arranged within the conductor channel and being connected to the electrically conductive coating to lead an electric current into the electrically conductive coating to heat the inner wall. In an embodiment of the method, manufacturing the pipe body may correspondingly comprise forming a conductor channel along the pipe body in between the inner wall and the outer wall. The method may further comprise inserting a conductor into the conductor channel and connecting the conductor to the electrically conductive coating. In one very simple embodiment, the conductor may be a separate component, e.g., a metal wire, that is just slit into the conductor channel. However, in other embodiments the conductor may be formed already in the 3D printing step.

According to further embodiments, the double-walled pipe may comprise a thermal insulation layer surrounding the outer wall. An embodiment of the method may correspondingly comprise surrounding the outer wall with a thermal insulation layer. The insulating layer may be made, for example, from an elastomer or a similarly suited material and may be provided as a flexible tube or the like that is pulled over the outer wall of the double-walled pipe.

According to some embodiments of the method, the 3D printing technique may comprise stereolithography (SL). SL is one exemplary advantageous 3D printing technique that offers a particularly rapid way of producing complicated three-dimensional plastic parts or components from a digital representation of the three-dimensional part. The method makes use of an ultraviolet curable photopolymer that is provided in liquid form. An ultraviolet laser is typically used to cure the surface of the liquid layer by layer according to the cross-section of the respective part to be produced.

A computer-readable medium according to a further aspect of the invention may comprise computer-executable instructions which, when executed on a data processing apparatus, cause the data processing apparatus to perform a method according to the invention.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. In the figures, like reference numerals denote like or functionally like components, unless indicated otherwise.

DETAILED DESCRIPTION OF THE PREFERRED EMBODIMENTS

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Figure 1:
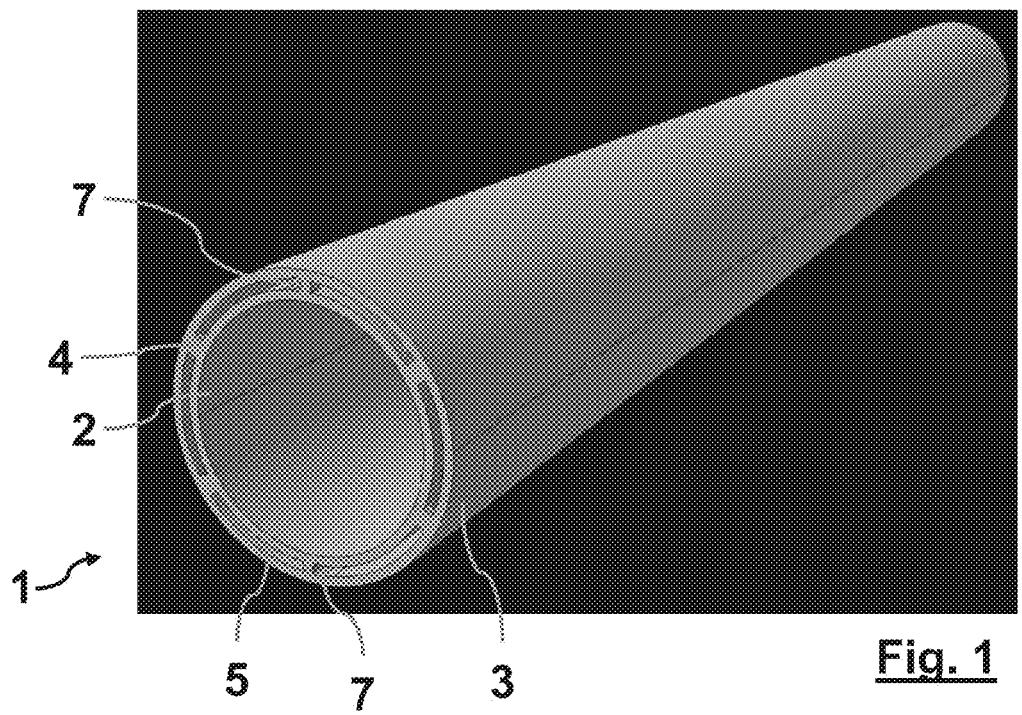
FIG. 1 shows a perspective view of a pipe body of a double-walled pipe according to an embodiment of the invention.

FIG. 1 shows a perspective view of a pipe body of a double-walled pipe according to an embodiment of the invention.

In FIG. 1 reference sign 1 denotes a pipe body. The pipe body 1 is a rigid plastic component formed as one integral piece, e.g., from thermoplastics or the like. The pipe body 1 comprises an inner wall 2, an outer wall 3 and a plurality of wall supports 4. The wall supports 4 connect the inner wall 2 with the outer wall 3. In this embodiment of the invention the wall supports 4 are formed as thin strut-like structures that are spread across the entire (inner) lateral surface of the pipe body 1 in between the inner wall 2 and the outer wall 3. The exact shape of the wall supports 4 may be better comprehended from FIG. 2 (see below). The inner wall 2 and the outer wall 3 together define an intermediate space 5. The intermediate space 5 defines a circumferential gap in between the inner wall 2 and the outer wall 3, which has a substantially constant diameter along the pipe body 1. The intermediate space 5 is traversed in longitudinal direction of the pipe body 1 by two conductor channels 7, which both have circular cross sections.

Figure 3:
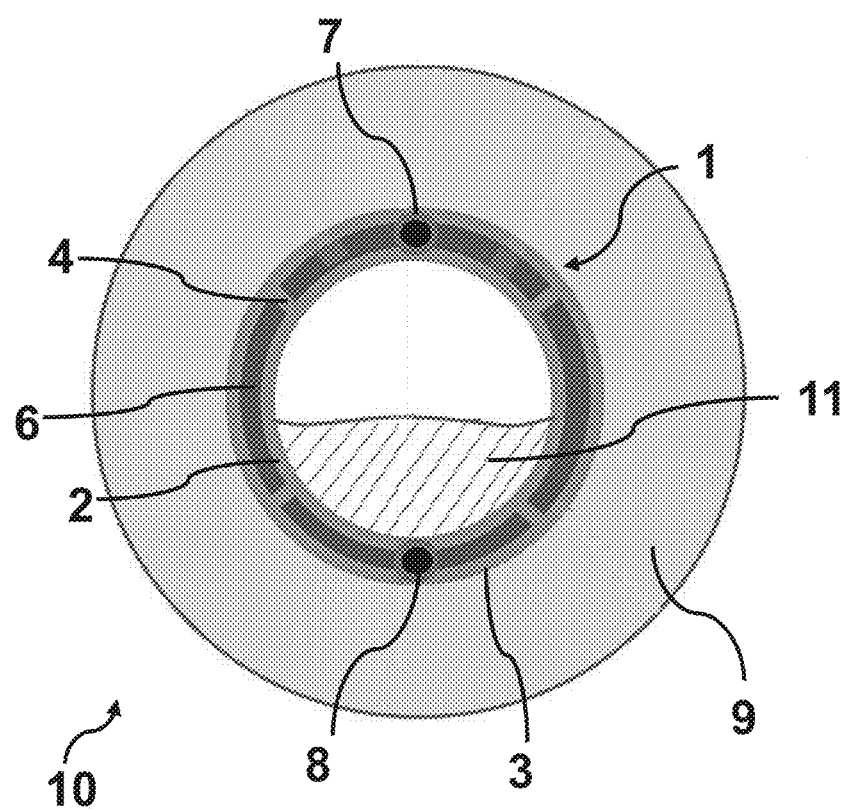
FIG. 3 schematically illustrates a double-walled pipe according to an embodiment of the invention including the pipe body of FIG. 1.
Figure 4:
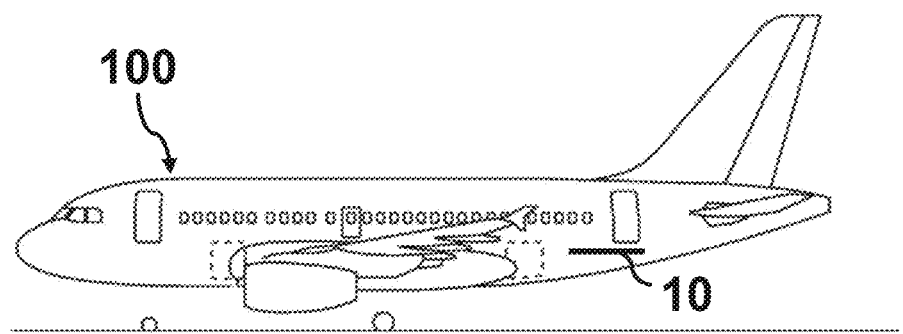
FIG. 4 schematically illustrates an aircraft being equipped with the double-walled pipe of FIG. 3.

The pipe body 1 is shown in a perspective view so as to better illustrate the principles of the depicted exemplary embodiment of the invention. The pipe body 1 may be part of double-walled pipe 10 as it is depicted in FIG. 3 (discussed in detail further below), which may be utilized within a waste water transportation piping system of a commercial airplane 100, as it is schematically depicted in FIG. 4. However, the present invention is not confined to this kind of use case and can be utilized in various technical fields and applications, like general aircraft or spacecraft, landborne or waterborne vehicles, etc. As will be described below, the pipe body 1 is part of a double-walled pipe 10 that features an integrated heating arrangement (not shown in FIG. 1), which is situated within the intermediate space 5 and powered by two conductors 8 disposed inside the conductor channels (also not shown in FIG. 1). The pipe body 1 may be used to transport waste water within the inner wall 2. The purpose of the heating arrangement is to heat up the inner wall 2 of the pipe body 1 such that the waste water cannot freeze even if the ambient temperature should drop to very low degrees. The double-walled pipe 10 hence may serve as ice protection or deicing means. However, the present invention may be employed in a very general way to heat up transport pipes or conduits or the like in order to avoid freezing or to defrost components. Thus, the present invention is particularly suited for many kinds of general ice protection applications. In principle, the technology of conductive coating heating is also applicable for floor panels, wing surfaces and other components of aircraft, potentially including heating of cabin and cargo compartments.

It will be clear for the person of skill that the depicted pipe body 1 is of exemplary nature and many other configurations, shapes, dimensions and arrangements of the pipe body 1 and its parts are possible. For example, the pipe body 1 may comprise only one conductor channel 7 in a different configuration. Alternatively, the pipe body 1 may comprise a plurality of conductor channels 7. The wall supports 4 may be configured differently. For example, they may be arranged and shaped as thin walls running along the pipe body 1. The pipe body 1 may have a different general shape. In particular, the present invention can be equally utilized for conduits that do not have the shape of a circular cylinder, but have a rectangular shape, for example. Depending on the use case at hand, the person skilled in the art will be able to implement an optimal configuration for the given situation.

The pipe body 1 may be manufactured using an additive manufacturing or 3D printing method. In particular, the device may be formed using stereolithography or a similar method. As these methods allow to produce even complex rigid integral objects from various distinct materials, like, for example, different synthetic polymers, such a pipe body 1 and/or the corresponding double-walled pipe 10 may replace conventional piping made from metals or metal alloys, like stainless steel or titanium. Additive manufacturing makes it possible to form hollow structures even in the submillimeter regime. Hence, in one exemplary embodiment the outer wall 3 may have an outer diameter in between 5 mm and 50 mm, e.g., 12 mm or 25 mm. The intermediate space 5 on the other hand may have a radial diameter of several hundred micrometers or less, e.g., less than 300 μm.

Figure 2:
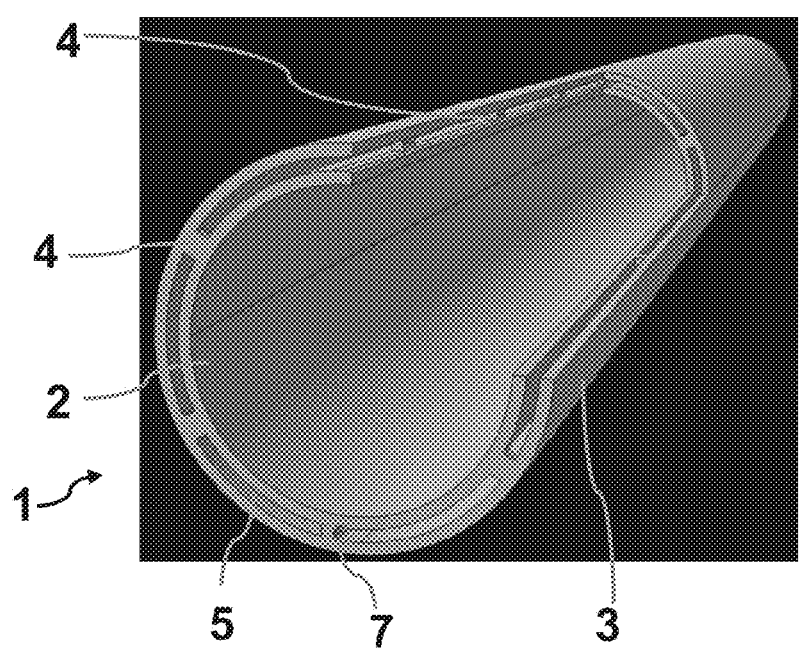
FIG. 2 shows the pipe body of FIG. 1 in a partially opened perspective.

FIG. 2 shows the pipe body 1 of FIG. 1 in a partially opened perspective to better illustrate the shape of the pipe body 1 and its subparts. In particular, it can be verified that the wall supports 4 are shaped as thin strut-like structures (see upper part of FIG. 2). The wall supports 4 may be distributed regularly across the lateral (inner) surface of the pipe body 1 in between the inner wall 2 and the outer wall 3. Modern AM or 3D printing methods even allow to form very complex three-dimensional (hollow) structures, which may contain small dimensioned substructures.

FIG. 3 schematically illustrates a double-walled pipe 10 according to an embodiment of the invention including the pipe body 1 of FIG. 1.

The double-walled pipe 10 in FIG. 3 is an exemplary embodiment of a fully equipped and operable pipe system with integrated heating according to the present invention. The double-walled pipe 10 is configured to transport fluid 11, e.g., water. To prevent the fluid 11 from freezing, the intermediate space 5 in between the inner wall 2 and the outer wall 3 is filled with an electrically conductive coating 6. The electrically conductive coating 6 may be an admixture of a synthetic resin or other polymer and carbon particles. Due to the carbon particles, the electrically conductive coating 6 becomes electrically conductive and can be used to heat the inner wall 2 of the double-walled pipe 10. For this, the electrically conductive coating 6 in this exemplary embodiment is connected with two conductors 8, e.g., metal wires or other suitable means, which have been brought into the conductor channels 7. The conductors 8 are configured to lead an electric current into the electrically conductive coating 6 to heat the inner wall 2 of the double-walled pipe 10. The thickness of the electrically conductive coating 6 is directly related to the resistivity of the coating and thus determines the heating properties of the double-walled pipe 10, e.g., the heat distribution across the surface of the inner wall 2. As the electrically conductive coating 6 completely fills out the intermediate space 5, the configuration and dimensions of the intermediate space 5 hence define the thickness of the electrically conductive coating layer 6 and thus determine the heating properties of the double-walled pipe 10. However, also alternative configurations of the electrically conductive coating 6 may be provided, e.g., instead of carbon particles, silver particles or nickel particles or the like may be added to a synthetic polymer or resin.

The electrically conductive coating 6 may have a positive temperature coefficient and thus may be self-regulating in the sense that overheating of the double-walled pipe 10 is avoided. The electrically conductive coating 6 may be configured such that if the temperature rises to a certain level the resistivity drops below a threshold value and the double-walled pipe 10 is no longer heated. Thus, any additional safety system for regulating the temperature and the heating is not necessary and the pipe system can be kept as simple as possible. It should be clear that the described composition and arrangement of the electrically conductive coating 6 is purely exemplary and that other configurations may be provided without departing from the present invention. In particular, the electrically conductive coating 6 may be formed together with the pipe body 1 in one single manufacturing step by using suitable additive manufacturing techniques that allows to combine several distinct synthetic materials, e.g., two synthetic polymers that may have admixtures of particle for providing electrical conductivity. However, in principle other embodiments may be provided where the electrically conductive coating 6 is brought into the intermediate space 5 only after forming the pipe body 1. For example, the electrically conductive coating 6 may be injected or absorbed into the intermediate space 5 by a vacuum.

The outer wall 3 of the double-walled pipe 10 serves as electrical and thermal insulation to the outside. Nevertheless, an additional thermal insulation layer 9 may be advantageous. The thermal insulating layer 9 may be made from an elastomer or a similarly suited material and may be provided as a flexible tube or the like that is pulled over the outer wall 3 of the double-walled pipe 10. Alternatively, the thermal insulation layer 9 may be, for example, sprayed on the outer wall 3 or may be put up by other suitable means.

Figure 5:
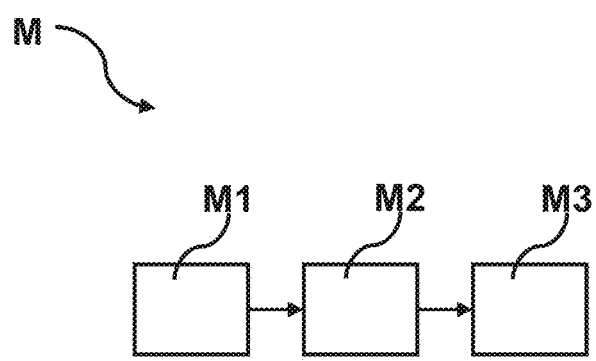
FIG. 5 shows a flow diagram of a method for manufacturing a double-walled pipe according to another embodiment of the invention.

FIG. 5 shows a flow diagram of a method M for manufacturing a double-walled pipe 10 according to another embodiment of the invention.

The method M comprises at M1 manufacturing a rigid pipe body 1 in one piece from plastic with an inner wall 2, an outer wall 3 and a plurality of wall supports 4, and an electrically conductive coating 6 surrounding the inner wall 2 using an AM or 3D printing technique. Hence, the pipe body 1 and the electrically conductive coating 6 may be formed in one single AM manufacturing step, for example, by printing with several distinct materials at the same time. In particular, the AM method may comprise stereolithography or a related technique.

The step of manufacturing the pipe body 1 may comprise forming a conductor channel 7 along the pipe body 1 in between the inner wall 2 and the outer wall 3. Further, the method M may include at M2 inserting a conductor 8 into the conductor channel 7 and connecting the conductor 8 to the electrically conductive coating 6. In addition, the method M may include at M3 surrounding the outer wall 3 with a thermal insulation layer 9.

The embodiments were chosen and described in order to best explain the principles of the invention and its practical applications, to thereby enable others skilled in the art to best utilize the invention and various embodiments with various modifications as are suited to the particular use contemplated. Many other examples will be apparent to one skilled in the art upon reviewing the above specification.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A double-walled pipe with integrated heating capability for an aircraft or spacecraft, comprising:
   a pipe body rigidly formed in one piece from plastic with an inner wall, with an outer wall and with a plurality of wall supports, the wall supports connecting the inner wall to the outer wall, the inner wall and the outer wall defining an intermediate space; and
   an electrically conductive coating surrounding the inner wall within the intermediate space and configured to heat up under application of an electric current such that heat is transferred to the inner wall, wherein the electrically conductive coating fills up the intermediate space from the inner wall to the outer wall.

2. The double-walled pipe of claim 1 wherein the pipe body and the electrically conductive coating are integrally formed.

3. The double-walled pipe of claim 1 wherein the electrically conductive coating has a positive temperature coefficient (PTC).

4. The double-walled pipe of claim 1 wherein the electrically conductive coating is an admixture of a synthetic resin and carbon particles.

5. The double-walled pipe of claim 1 wherein the intermediate space defines a circumferential gap in between the inner wall and the outer wall having a substantially constant diameter along the pipe body.

6. The double-walled pipe of claim 1 wherein the outer wall has an outer diameter in between 5 mm and 50 mm and the electrically conductive coating has a radial thickness of less than 300 μm.

7. The double-walled pipe of claim 1, further comprising:
a conductor channel formed along the pipe body within the intermediate space; and
a conductor arranged within the conductor channel and being connected to the electrically conductive coating to lead an electric current into the electrically conductive coating to transfer heat into the inner wall.

8. The double-walled pipe of claim 1, further comprising a thermal insulation layer surrounding the outer wall.

9. An aircraft or a spacecraft comprising a double-walled pipe with integrated heating capability, the double-walled pipe comprising:
a pipe body rigidly formed in one piece from plastic with an inner wall, with an outer wall and with a plurality of wall supports, the wall supports connecting the inner wall to the outer wall, the inner wall and the outer wall defining an intermediate space; and
an electrically conductive coating surrounding the inner wall within the intermediate space and configured to heat up under application of an electric current such that heat is transferred to the inner wall, wherein the electrically conductive coating fills up the intermediate space from the inner wall to the outer wall.

10. A method for forming a double-walled pipe with integrated heating capability for an aircraft or spacecraft, the method comprising:
manufacturing a rigid pipe body in one piece from plastic with an inner wall, an outer wall and a plurality of wall supports, the wall supports connecting the inner wall to the outer wall, the inner wall and the outer wall defining an intermediate space, and an electrically conductive coating surrounding the inner wall within the intermediate space, wherein the electrically conductive coating fills up the intermediate space from the inner wall to the outer wall and is configured to heat up under application of an electric current such that heat is transferred to the inner wall, using an additive manufacturing or 3D printing technique.

11. The method of claim 10, wherein the 3D printing technique comprises stereolithography.

12. The method of claim 10, wherein manufacturing the pipe body comprises forming a conductor channel along the pipe body in between the inner wall and the outer wall; and wherein the method further comprises inserting a conductor into the conductor channel and connecting the conductor to the electrically conductive coating.

13. The method of claim 10, further comprising surrounding the outer wall with a thermal insulation layer.

14. A computer-readable medium comprising computer-executable instructions which, when executed on a data processing apparatus, cause the data processing apparatus to perform a method for forming a double-walled pipe with integrated heating capability for an aircraft or spacecraft, the method comprising:
manufacturing a rigid pipe body in one piece from plastic with an inner wall, an outer wall and a plurality of wall supports, the wall supports connecting the inner wall to the outer wall, the inner wall and the outer wall defining an intermediate space, and an electrically conductive coating surrounding the inner wall within the intermediate space, wherein the electrically conductive coating fills up the intermediate space from the inner wall to the outer wall and is configured to heat up under application of an electric current such that heat is transferred to the inner wall, using an additive manufacturing or 3D printing technique.

* * * * *